(12) United States Patent
Caporal Del Barrio et al.

(10) Patent No.: US 12,519,519 B2
(45) Date of Patent: Jan. 6, 2026

(54) PROVIDING A FIRST RADIO BEAM AND A SECOND RADIO BEAM

(71) Applicant: NOKIA TECHNOLOGIES OY, Espoo (FI)

(72) Inventors: Samantha Caporal Del Barrio, Aalborg (DK); Sami Hakola, Kempele (FI); Benny Vejlgaard, Gistrup (DK); Johannes Harrebek, Aalborg (DK); Christian Rom, Aalborg (DK); Frederick Vook, Schaumburg, IL (US); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 371 days.

(21) Appl. No.: 18/245,192

(22) PCT Filed: Sep. 1, 2021

(86) PCT No.: PCT/FI2021/050590
§ 371 (c)(1),
(2) Date: Mar. 14, 2023

(87) PCT Pub. No.: WO2022/053740
PCT Pub. Date: Mar. 17, 2022

(65) Prior Publication Data
US 2023/0361825 A1    Nov. 9, 2023

(30) Foreign Application Priority Data

Sep. 14, 2020   (FI) ...................................... 20205884

(51) Int. Cl.
*H04B 7/00* (2006.01)
*H04B 7/06* (2006.01)

(52) U.S. Cl.
CPC ......... *H04B 7/0617* (2013.01); *H04B 7/0619* (2013.01); *H04B 7/06952* (2023.05)

(58) Field of Classification Search
CPC .. H04B 7/0617; H04B 7/0619; H04B 7/0691; H04B 7/0695; H04B 7/0408; H04B 7/10;
(Continued)

(56) References Cited

U.S. PATENT DOCUMENTS

| 11,722,198 B2 * | 8/2023 | Oteri .................... H04B 7/0417 370/329 |
| 2009/0075645 A1 | 3/2009 | Karabinis |

(Continued)

FOREIGN PATENT DOCUMENTS

| WO | WO 2017/186282 A1 | 11/2017 |
| WO | WO 2017/196612 A1 | 11/2017 |

(Continued)

OTHER PUBLICATIONS

"3rd Generation Partnership Project; Technical Specification Group Radio Access Network; NR; Physical layer procedures for data (Release 15)", 3GPP TS 38.214 v15.10.0, (Jun. 2020), 106 pages.

(Continued)

*Primary Examiner* — Md K Talukder
(74) *Attorney, Agent, or Firm* — ALSTON & BIRD LLP

(57) ABSTRACT

An apparatus, method and computer program product for: providing (305) at least one single-polarized radio beam in a first direction, receiving (310) feedback for modifying operation of a terminal device for maintaining a radio connection, determining (315), in response to receiving the feedback, a first radio beam and a second radio beam, wherein the first radio beam and the second radio beam are single-polarized, providing (320) the first radio beam in the first direction and the second radio beam in a second direction and determining (325), based on the feedback
(Continued)

relating to the first radio beam and the second radio beam, a need for reconfiguration of a following transmission of the first radio beam and the second beam.

16 Claims, 4 Drawing Sheets

(58) Field of Classification Search
CPC .. H04L 5/0025; H04L 5/0094; H04W 52/245; H04W 52/42; H04W 52/0219; H04W 52/0245; H04W 76/25; Y02D 30/70
See application file for complete search history.

(56) References Cited

U.S. PATENT DOCUMENTS

| | | | |
|---|---|---|---|
| 2015/0146650 A1 | 5/2015 | Ko et al. | |
| 2016/0119958 A1* | 4/2016 | Tan | H04W 74/002 370/336 |
| 2016/0365900 A1 | 12/2016 | Kim et al. | |
| 2018/0199258 A1 | 7/2018 | Cezanne et al. | |
| 2019/0020123 A1 | 1/2019 | Petersson et al. | |
| 2019/0068263 A1 | 2/2019 | Yu et al. | |
| 2019/0089441 A1 | 3/2019 | Sivahumaran | |
| 2019/0141640 A1* | 5/2019 | Abedini | H04W 52/146 |
| 2019/0230597 A1 | 7/2019 | Akkarakaran et al. | |
| 2019/0334595 A1 | 10/2019 | Ji et al. | |
| 2020/0007221 A1* | 1/2020 | Nilsson | H04B 7/088 |
| 2020/0068495 A1 | 2/2020 | Yang et al. | |
| 2020/0186217 A1* | 6/2020 | Jidhage | H04B 7/0617 |
| 2021/0127379 A1 | 4/2021 | Harrebek et al. | |
| 2021/0218441 A1* | 7/2021 | Wang | H04B 7/0671 |
| 2021/0258061 A1 | 8/2021 | Harrebek et al. | |
| 2021/0258064 A1* | 8/2021 | Yu | H04M 1/72454 |
| 2023/0352838 A1 | 11/2023 | Svendsen et al. | |
| 2023/0361825 A1* | 11/2023 | Caporal Del Barrio | H04B 7/10 |
| 2023/0361848 A1 | 11/2023 | Svendsen et al. | |

FOREIGN PATENT DOCUMENTS

| | | |
|---|---|---|
| WO | WO 2018/204340 A1 | 11/2018 |
| WO | WO 2018/219435 A1 | 12/2018 |
| WO | WO 2020/032847 A1 | 2/2020 |

OTHER PUBLICATIONS

"3rd Generation Partnership Project; Technical Specification Group Radio Access Network; NR; Requirements for support of radio resource management (Release 15)", 3GPP TS 38.133 v15.10.0, (Jun. 2020), 1161 pages.
"3rd Generation Partnership Project; Technical Specification Group Radio Access Network; NR; User Equipment (UE) radio transmission and reception; Part 1: Range 1 Standalone (Release 15)", 3GPP TS 38.101 v15.10.0, (Jun. 2020), 239 pages.
"3rd Generation Partnership Project; Technical Specification Group Radio Access Network; NR; User Equipment (UE) radio transmission and reception; Part 2: Range 2 Standalone (Release 15)", 3GPP TS 38-101-2 v15.10.0, (Jun. 2020), 150 pages.
"3rd Generation Partnership Project; Technical Specification Group Radio Access Network; Study on New Radio Access Technology Physical Layer Aspects (Release 14)", 3GPP TR 38.802 v14.2.0, (Sep. 2017), 145 pages.
First Examination Report for Indian Application No. 202347026675 dated Feb. 7, 2024, 8 pages.
International Search Report and Written Opinion for Patent Cooperation Treaty Application No. PCT/FI2021/050590 dated Nov. 26, 2021, 16 pages.
Notice of Allowance for Finland Application No. 20205884 dated Nov. 30, 2021, 4 pages.
NTT Docomo, Inc., "Remaining Issues on Multi-Beam Operation", 3GPP TSG RAN WG1 Meeting #100-e, R1-2000926, (Feb. 24-Mar. 6, 2020), 10 pages.
Office Action for Finland Application No. 20205884 dated Apr. 15, 2021, 8 pages.
Song et al., "Adaptive Millimeter Wave Beam Alignment for Dual-Polarized MIMO Systems", IEEE Transactions on Wireless Communications, vol. 14, No. 11, (Nov. 2015), 14 pages.
Extended European Search Report for European Application No. 21866148.6 dated Sep. 26, 2024, 13 pages.

* cited by examiner

PROVIDING A FIRST RADIO BEAM AND A SECOND RADIO BEAM

CROSS-REFERENCE TO RELATED APPLICATIONS

This application is a national phase entry of International Application No. PCT/FI2021/050590, filed Sep. 1, 2021, which claims priority to Finnish Application No. 20205884, filed Sep. 14, 2020, the contents of which are hereby incorporated by reference in their entirety.

TECHNICAL FIELD

The present application relates generally to a radio connection. More specifically, the present application relates to maintaining a radio connection.

BACKGROUND

Maintaining a radio connection is the base for function of user equipment. At the same time users' expectations related to performance of user equipment constantly rise.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

According to a second aspect of the invention, there is provided a method comprising providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

According to a third aspect of the invention, there is provided a computer program comprising instructions for causing an apparatus to perform at least the following: providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

According to a fourth aspect of the invention, there is provided an apparatus comprising at least one processor and at least one memory including computer program code, the at least one memory and the computer program code configured to with the at least one processor, cause the apparatus at least to: provide at least one single-polarized radio beam in a first direction, receive feedback for modifying operation of a terminal device for maintaining a radio connection, determine, in response to receiving the feedback, a first radio beam and a second radio beam, wherein the first radio beam and the second radio beam are single-polarized, provide the first radio beam in the first direction and the second radio beam in a second direction and determine, based on the feedback relating to the first radio beam and the second radio beam, a need for reconfiguration of a following transmission of the first radio beam and the second beam.

According to a fifth aspect of the invention, there is provided a non-transitory computer readable medium comprising program instructions for causing an apparatus to perform at least the following: providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

According to a sixth aspect of the invention, there is provided a computer readable medium comprising program instructions for causing an apparatus to perform at least the following: providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

According to a seventh aspect of the invention, there is provided a system comprising means for performing: providing at least one single-polarized radio beam in a first direction, receiving feedback for modifying operation of a terminal device for maintaining a radio connection, determining, in response to receiving the feedback, a first radio beam and a second radio beam, wherein the first radio beam and the second radio beam are single-polarized, providing the first radio beam in the first direction and the second radio beam in a second direction and determining, based on the feedback relating to the first radio beam and the second radio beam, a need for reconfiguration of a following transmission of the first radio beam and the second beam.

BRIEF DESCRIPTION OF THE DRAWINGS

Some example embodiments will now be described with reference to the accompanying drawings.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to utilizing radio beam polarization in autonomous beam alignment for uplink operation.

According to an example embodiment, an apparatus is configured to provide at least one single-polarized radio beam in a first direction, receive feedback for modifying operation of a terminal device for maintaining a radio connection, determine, in response to receiving the feedback, a first radio beam and a second radio beam, wherein the first radio beam and the second radio beam are single-polarized, provide the first radio beam in the first direction and the second radio beam in a second direction and determine, based on the feedback relating to the first radio beam and the second radio beam, a need for reconfiguration of a following transmission of the first radio beam and the second beam.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
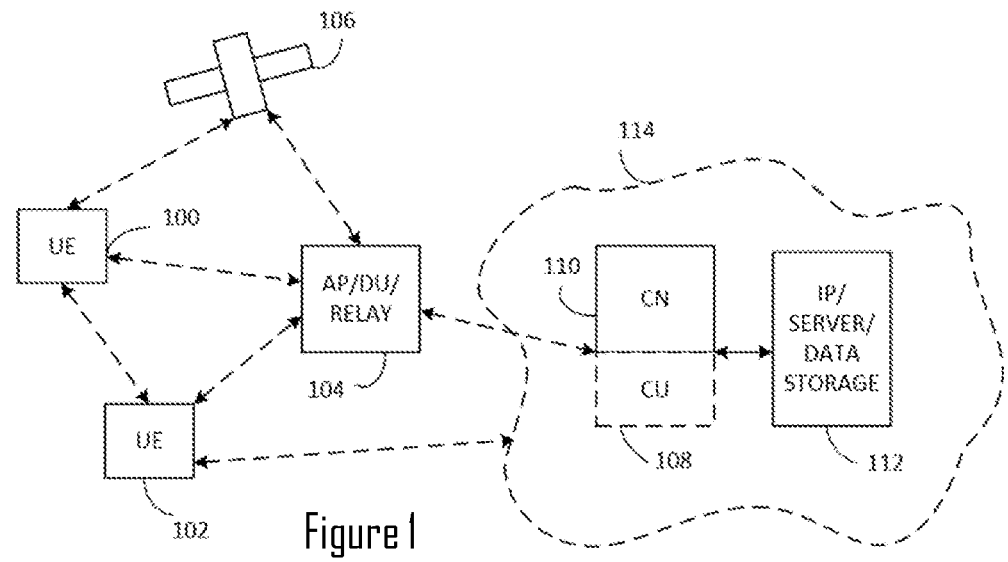
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

Wireless networks are configured to transmit data through radio beams. A radio beam provides an operating channel for transmitting data between a terminal device such as user equipment and an access node such as a gNodeB. A radio beam may be formed, for example, by a phased array antenna that comprises a plurality of antenna elements that are spatially arranged and electrically interconnected. The antenna elements may be configured to provide at least one polarization. Beamforming is a spatial filtering technique that comprises directional signal transmission or reception using an array of antenna elements. Directional transmission comprises directing radio energy through a radio channel towards a specific receiver. A radio beam direction may correspond to an entry in a beam codebook, and directing radio energy towards a specific receiver may comprise configuring a radio beam with a codebook entry related to a particular direction.

The apparatus 200 may be configured to operate in single-input, single output (SISO) mode or multiple-input, multiple-output (MIMO) mode. Operating in a MIMO mode comprises using multiple antennas at both the transmitter and receiver, thereby allowing transferring more than one data stream simultaneously over a single radio channel. Operating in a SISO mode comprises using single antenna at both the transmitter and receiver.

Operating in MIMO mode a terminal device may be capable of providing dual-polarized radio beams. Providing dual-polarized radio beam in certain direction comprises providing two single-polarized radio beams and configuring both single polarized radio beams with same codebook entry related to a particular direction.

A beamformed communication link between a terminal device and an access node such as gNodeB is correspondent when transmission and reception power are balanced. Correspondence between transmission and reception power may be achieved by devices aligning their reception and transmission using beamforming. Non-correspondence between transmission and reception power may be caused by many factors causing power imbalance between transmission and reception beams and resulting in changes in transmission and reception beams directivity.

An access node may be capable of monitoring the balance between transmission and reception power in a beamformed communication link. Detecting power decrease in terminal devices transmission, an access node may request a terminal device to increase power to uplink transmission. Alternatively, an access node may request a terminal device to adjust modulation coding scheme of the transmission radio beam. Further alternative may be both increasing transmit power and modifying modulation coding scheme for balancing the transmission and reception power in a beamformed communication link.

However, these actions may be power-consuming. Another challenge may be that uplink throughput is compromised. The example of FIG. 2 shows an exemplifying apparatus.

Figure 2:
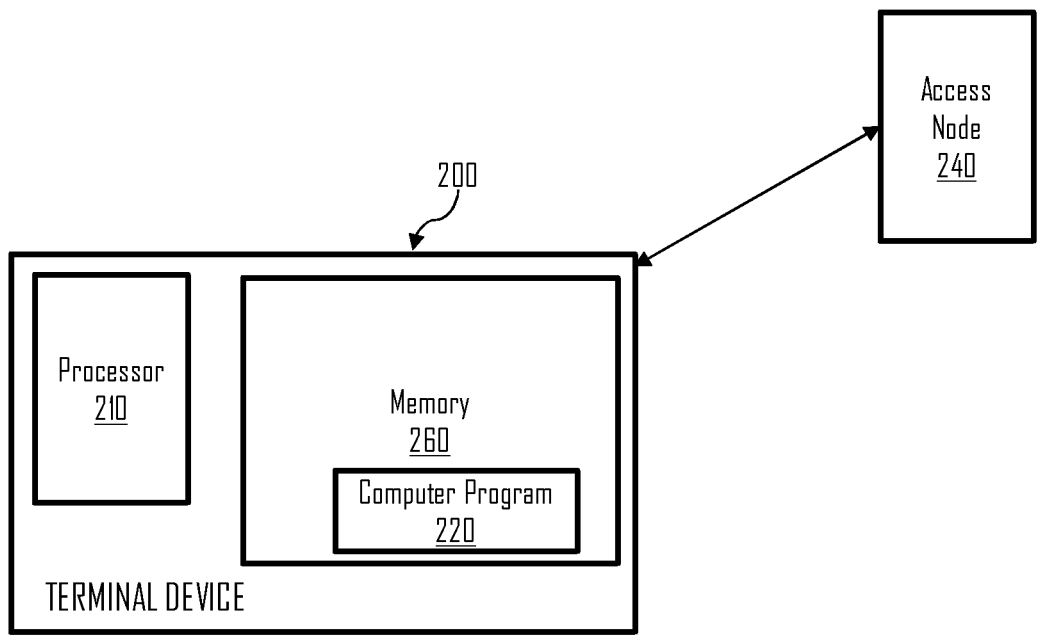
FIG. 2 shows a block diagram of an example apparatus in which examples of the disclosed embodiments may be applied.

FIG. 2 is a block diagram depicting an apparatus 200 operating in accordance with an example embodiment of the invention. The apparatus 200 may be, for example, an electronic device such as a chip, chip-set, an electronic device, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises a terminal device. A terminal device may comprise user equipment such as smart phone or a tablet computer. According to an example embodiment, the apparatus 200 is configured to communicate with an access node 240. Communicating with an access node may comprise transmitting and/or receiving data using at least one radio beam. According to an example embodiment, the apparatus 200 is configured to provide at least one polarized radio beam. The at least one polarized radio beam comprises at least one radio beam provided for uplink operation.

A radio beam may comprise a plurality of polarized radio beams. For example, a radio beam may comprise a first polarization (e.g., a horizontal polarization) and a second polarization (e.g., a vertical polarization) orthogonal to each other.

According to an example embodiment, the apparatus 200 is configured to provide at least one single-polarized radio beam in a first direction. Providing at least one polarized radio beam may comprise providing one or two polarized and orthogonal radio beams. The polarized radio beam may comprise, for example, a horizontal, a vertical, a right-hand circular or a left-hand circular polarization. Providing a polarized radio beam in a direction may comprise configuring a radio beam based on a codebook entry associated with a particular radio beam direction. Apparatus operating in SISO mode may be configured to provide a single radio beam in a direction. Apparatus operating in MIMO mode may be configured to provide a dual radio beam in a direction. Providing a dual radio beam comprises providing two radio beams configured based on same codebook entry associated with a particular radio beam direction.

According to an example embodiment, the apparatus 200 is configured to select based on at least one criterion, a first component of a dual beam as the first radio beam and a second component of a dual beam as the second radio beam. For example, the criterion may be related to radio beam power or speed. According to an example embodiment, the at least one criterion relates to power imbalance between the first component of the dual beam and the second component of the dual beam. According to an example embodiment, the at least one criterion comprises a predetermined threshold value for the power imbalance.

According to an example embodiment, the apparatus comprises a terminal device

According to an example embodiment, the apparatus 200 is configured to receive feedback for modifying operation of a terminal device for maintaining a radio connection. According to an example embodiment, the apparatus 200 is configured to receive the feedback from the access node 240. Feedback may comprise request to increase transmit power or to adjust modulation coding scheme. Feedback may comprise, for example, polarization relation indication. Terminal device may be configured to interpret feedback from base station in terms of requests as indication of required power level adjustment. The terminal device may be further configured to compare the feedback and interpret the smaller requests as greater power level and the greater requests as smaller power level.

Terminal device may be configured to interpret the feedback as a sign of beam non-correspondence.

According to an example embodiment, feedback for modifying operation of a terminal device comprises a request to increase a power level of a transmission radio beam. According to another example embodiment feedback for modifying operation of a terminal device comprises a request to adjust modulation coding scheme of the transmission radio beam. According to an example embodiment, feedback for modifying operation of a terminal device comprises a polarization relation indication of the transmission radio beam.

Without limiting the scope of the claims, an advantage of receiving a request of increasing a power level of the transmission radio beam or receiving a request to adjust modulation coding scheme may be that a terminal device may autonomously determine non-correspondence between transmission and reception power.

According to an example embodiment, the apparatus 200 is configured to determine, in response to receiving the feedback, a first radio beam and a second radio beam, wherein the first radio beam and the second radio beam are single-polarized. According to an example embodiment, the first radio beam is different from the second radio beam.

Interpreting the feedback from an access node the apparatus 200 takes into account operating in SISO mode or MIMO mode. When operating in SISO mode, adding a second beam may effect the transmission power negatively or positively.

By using DCI format 0_0 where physical uplink shared channel (PUSCH) transmission is based on a single antenna port, and DCI format 1_0 and 1_1 for physical uplink control channel (PUCCH), the apparatus 200 may be capable to separate requests to increase power level on PUCCH independent of operating in SISO mode or MIMO mode.

According to an example embodiment, the apparatus 200 is configured to provide the first radio beam in the first direction and the second radio beam in a second direction. Proving the first radio beam in the first direction and the second radio beam in a second direction may comprise transmitting the first radio beam in the first direction and the second radio beam in a second direction. According to an example embodiment, the first direction is different from the second direction.

Determining a first radio beam for maintaining current UL connection and a second radio beam for searching for a stronger UL connection, an apparatus 200 may interpret feedback from an access node based on comparison between a horizontal component of radio beam and a vertical component of radio beam of a radio beam transmitted by the apparatus 200. When power levels of the horizontal component of radio beam and the vertical component of radio beam are different from each other determining the component of beam t with greater power level as a first radio beam for maintaining the connection may reduce the risk for decrease in connection quality.

Small imbalance between power levels of a horizontal component of radio beam and a vertical component of radio beam of a radio beam transmitted by the apparatus 200 may benefit the realignment process, as power level for maintaining the current connection remains in an acceptable level.

On the other hand, if the imbalance between power levels of a horizontal component of radio beam and a vertical component of radio beam of a radio beam transmitted by the apparatus 200 is high, the search sensitivity of the radio beam may be low. Therefore, the apparatus 200 may be configured with a threshold value defining that when the imbalance is above the threshold value a second radio beam is provided and when the imbalance is below the threshold value the second radio beam is not provided.

According to an example embodiment, providing the first radio beam and the second radio beam comprises splitting a dual-polarized radio beam into a first single-polarized radio beam and a second single-polarized radio beam. Splitting a dual-polarized radio beam into a first single-polarized radio beam and a second single-polarized radio beam may comprise reconfiguring a dual-polarized radio beam into a first single-polarized radio beam in a first angular direction and a second single-polarized radio beam in a second angular direction.

Providing the first radio beam and the second radio beam comprises reconfiguring the at least one polarized radio beam in a first direction into a first single-polarized radio beam in a first direction and a second single-polarized radio beam in a second direction. Reconfiguring dual-polarized radio beams may comprise separating in angular domain a first polarization and a second polarization from dual-polarized radio beam provided by array antenna. The first polarization may comprise a horizontal polarization and the second polarization may comprise a vertical polarization, the first polarization and the second polarization being orthogonal to each other.

Providing the first radio beam in the first direction comprises configuring the first radio beam based on a first codebook entry associated with the first direction. Providing the second radio beam in the second direction comprises configuring the second radio beam based on a second codebook entry associated with the second direction.

According to an example embodiment, the apparatus 200 is configured to determine, based on feedback relating to the first radio beam and the second radio beam, a need for reconfiguration of a following transmission of the first radio beam and the second beam.

Reconfiguration of a following transmission of the first radio beam and the second radio beam may comprise changing a direction of the first radio beam or the second radio beam. Changing a direction of the first radio beam may comprise changing the direction of the first radio beam to the direction of the second radio beam. Changing a direction of the second radio beam may comprise changing the direction of the second radio beam to a direction associated with a codebook entry adjacent to the codebook entry associated with the first direction or adjacent to the codebook entry associated with the second direction.

According to an example embodiment, the apparatus 200 is configured to provide the first radio beam in the second direction According to an example embodiment, providing the second radio beam comprises providing an additional radio beam. Terminal device may configure this new radio beam based on a second codebook entry.

In other words, a terminal device may interpret feedback from an access node as a sign for beam non-correspondence and thus as a need to realign a transmission radio beam. In response to receiving feedback from an access node a terminal device may autonomously either split the dual-polarized radio beam into two single-polarized radio beams or provide an additional radio beam, and utilize the two radio beams to regain beam correspondence with an access node.

Utilizing two single-polarized radio beams a terminal device may be capable to maintain the connection to an access node with one of the radio beams and search for a stronger connection with the other radio beam.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for providing a polarized radio beam in a first direction, means for receiving feedback for modifying operation of a terminal device for maintaining a radio connection, means for determining, in response to receiving the feedback, a first radio beam and a second radio beam, wherein the first radio beam and the second radio beam are single-polarized, means for providing the first radio beam in the first direction and the second radio beam in a second direction, and means for determining, based on feedback relating to the first radio beam and the second radio beam, a need for reconfiguration of a following transmission of the first radio beam and the second beam, The apparatus 200 may further comprise means for selecting, based on at least one criterion, a first component of dual beam as the first radio beam and a second component of dual beam as the second radio beam.

Figure 3:
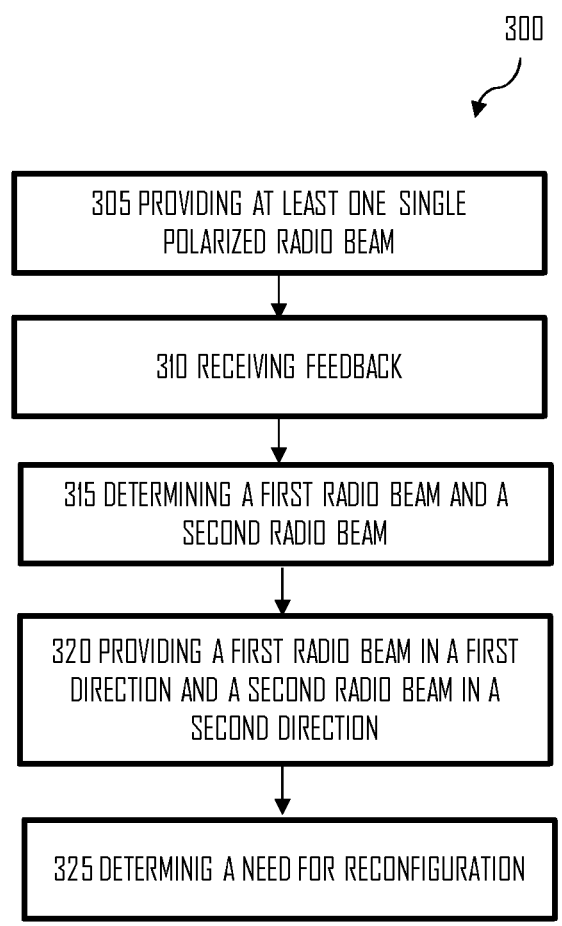
FIG. 3 illustrates an example method according to an example embodiment of the invention.

FIG. 3 illustrates an example method 300 incorporating aspects of the previously disclosed embodiments. More specifically the example method 300 illustrates an apparatus for receiving feedback, providing a first radio beam and a second radio beam and providing the first radio beam in the first direction and the second radio beam in the second direction. The method 300 may be performed, for example, by the apparatus 200.

The method starts with providing 305 at least one single polarized radio beam in a first direction.

The method continues with receiving 310 feedback for modifying operation of a terminal device for maintaining a radio connection. The feedback may comprise, for example, a request to increase power level of a transmission beam or a request to adjust modulating radio scheme.

The method continues with determining 315, in response to receiving the feedback, a first radio beam and a second radio beam, wherein the first radio beam and the second radio beam are single-polarized.

The method further continues with providing 320, the first radio beam in a first direction and the second radio beam in a second direction. Providing the first radio beam and the second radio beam may comprise splitting a dual-polarized radio beam into a first single-polarized radio beam and a second single-polarized radio beam. Alternatively, providing a second radio beam comprises providing an additional radio beam.

The method further continues with determining 325, based on the feedback relating to the first radio beam and the second radio beam, a need for reconfiguration of a following transmission of the first radio beam and the second radio beam.

Figure 4:
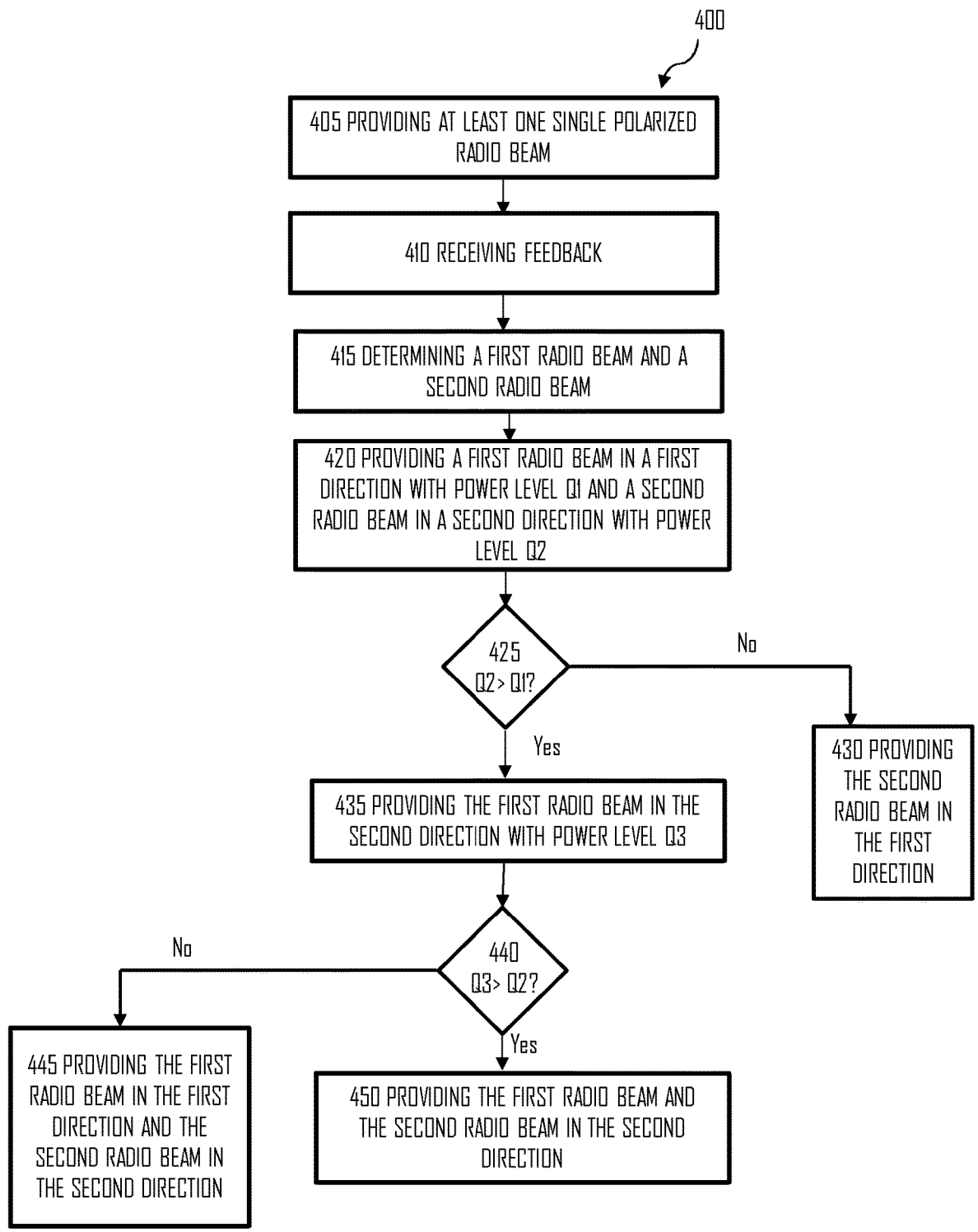
FIG. 4 illustrates another example method according to an example embodiment of the invention.

FIG. 4 illustrates another example method 400 incorporating aspects of the previously disclosed embodiments. More specifically the example method 400 illustrates an apparatus 200 for receiving feedback, providing a first radio beam and a second radio beam and providing the first radio beam in the first direction and the second radio beam in the second direction and determining, based on the feedback relating to the first radio beam and the second radio beam, a need for reconfiguration of a following transmission of the first radio beam and the second beam. The method 400 may be performed, for example, by the apparatus 200.

The method starts with apparatus 200 providing 405 at least one single polarized radio beam in a first direction. The apparatus 200 may be operating in SISO mode or MIMO mode. For terminal device working in SISO mode, a transmission radio beam may comprise a single polarized radio beam. For a terminal device operating in MIMO mode, a transmission radio beam may comprise a dual-polarized radio beam comprising two single-polarized radio beams for example, a horizontal radio beam and a vertical radio beam configured in the same direction, The method further continues with receiving 410 feedback for modifying operation of a terminal device for maintaining a radio connection. The feedback may comprise, for example, a request to increase power level of a transmission beam or a request to adjust modulating radio scheme. The apparatus 200 may be configured to interpret the feedback from the access node as a sign of radio beam misalignment.

The method further continues with determining 415, in response to receiving the feedback, a first radio beam and a second radio beam, wherein the first radio beam and the second radio beam are single-polarized. Determining a first radio beam and a second radio beam may comprise splitting a dual-polarized radio beam into two single-polarized radio beams if the apparatus 200 is operating in a MIMO mode or adding a single-polarized radio beam if the apparatus 200 is operating in a SISO mode. The second radio beam may be different from the first radio beam.

The terminal device may be configured to interpret the feedback for detecting the imbalance between transmission components of radio beam.

Interpreting feedback when operating in SISO mode may comprise taking into account effect of an added radio beam.

The apparatus 200 may be configured to interpret the feedback received from the access node. Interpreting may comprise, for example, using DCI format 0_0. DCI format 1_0 and/or DCI format 1_1 for detecting the imbalance between components of transmission radio beam.

Based on the feedback about the radio beam power imbalance between components of transmission radio beam apparatus 200 may determine the component of radio beam with greater power level as a first radio beam for maintaining connection with an access node. Further, apparatus 200 may determine the component of radio beam with lower power level as a second radio beam.

The method further continues with providing 420 the first radio beam in the first direction and the second radio beam in a second direction. The first radio beam is provided in the first direction for maintaining the original connection. The second radio beam is provided in the second direction, different from the first direction, for searching for connection with greater power level than the power level of the first radio beam in the first direction.

The apparatus 200 may provide the second radio beam in the adjacent direction from the first direction. Providing the second radio beam in the second direction may comprise configuring the second radio beam based on a codebook entry associated with the second direction.

In response to providing the first radio beam and the second radio beam, the apparatus 200 may receive feedback from the access node relating to the first radio beam and the second radio beam. Based on the feedback a terminal device may determine power level Q1 for the first radio beam in the first direction and power level Q2 for the second radio beam in the second direction. The feedback may comprise requests from an access node to increase transmission power of a terminal device, or requests to adjust modulation coding scheme.

The method further continues with comparing 425 the power level Q2 of the second radio beam in the second direction with the power level Q1 of the first radio beam in the first direction.

In response to determining that Q2 is not greater than Q1 the method continues with providing 430 the second radio beam in the first direction. After completing 430 the process may return to block 405.

In response to determining that Q2 is greater than Q1 the method further continues with providing 435 the first radio beam in the second direction. Interpreting feedback from an access node 240 the apparatus 200 may comprise determining combined power level Q3 of the first radio beam in the second direction and the second radio beam in the second direction.

The method further continues with comparing 440 the combined power level Q3 of both the first and the second radio beam in the second direction to the power level Q2 of the second radio beam in the second direction.

In response to determining that Q3 is greater than Q2 the method continues with providing 450 the first radio beam and the second radio beam in the second direction. After completing 450 the process may return to block 405.

In response to determining that Q3 is not greater than Q2 the method continues with providing 445 the first radio beam in the first direction and the second radio beam in the second direction. Thus, the apparatus 200 is operating with two radio beams in two directions. After completing 445 the process may return to block 405.

Figure 5A:
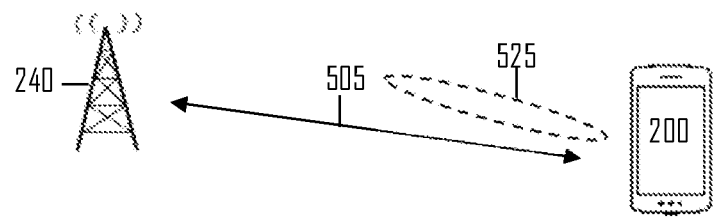
FIGS. 5a, 5b and 5c illustrate an example process according to an example embodiment of the invention.
Figure 5B:
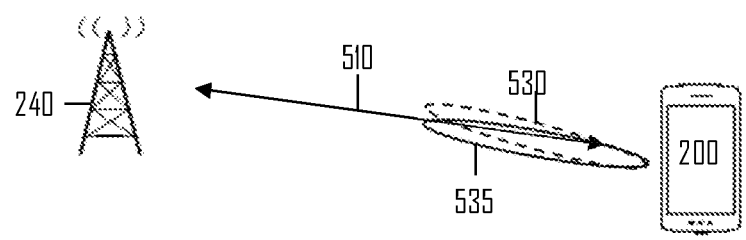
Figure 5C:
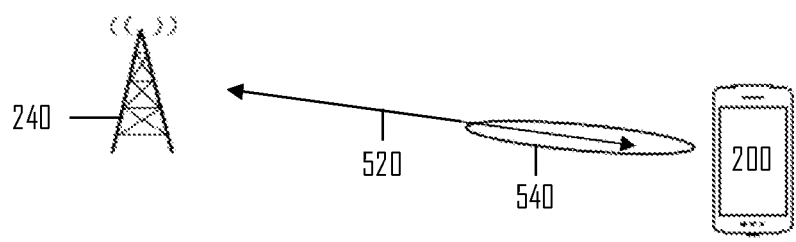

FIGS. 5a, 5b and 5c illustrate an example process incorporating aspects of the previously disclosed embodiments. In the examples of FIGS. 5a, 5b and 5c it is assumed that apparatus 200 comprises a terminal device.

In the example of FIG. 5a, the apparatus 200 transmits at least one single polarized radio beam 525 in a first direction. Transmitting one or two radio beams is determined by whether operating in SISO mode or MIMO mode, respectively. The terminal device receives feedback 505 from an access node 240.

In the example of FIG. 5b, based on the feedback received from the access node 240 operating in MIMO mode the apparatus 200 splits the dual-polarized radio beam 525 of FIG. 5a into a first single-polarized radio beam 530 and a second single-polarized radio beam 535. Single-polarized radio beam may comprise a vertically polarized radio beam and a horizontally polarized radio beam.

Alternatively, when operating in SISO, in the example of FIG. 5b, based on the feedback received from the access node 240, the apparatus 200 adds a second radio beam for transmission.

Further, in the example of FIG. 5b, the apparatus 200 utilizes the first radio beam 530 to maintain the current connection to the access node 240 and utilizing the second radio beam 535 for searching a radio beam stronger than the first radio beam 530. The terminal device receives combined feedback 510 relating to a first radio beam 530 and a second radio beam 535. In response of interpreting the feedback 510 the apparatus 200 may reconfigure radio beams 530 and 535.

In the example of FIG. 5c, assuming that the second radio beam 535 of the FIG. 5b comprises a greater power level than the first radio beam 530 of the FIG. 5b, the apparatus 200 configures the first radio beam 530 based on the codebook entry of second radio beam 535 to the second direction. The terminal device may further receive feedback 520 relating to the polarized radio beam 540. When operating in SISO mode, radio beam 540 may comprise a single-polarized uplink transmission radio beam. When operating in MIMO mode, radio beam 540 may comprise two single-polarized uplink transmission radio beams configured based on same codebook entry.

Without limiting the scope of the claims, an advantage of one or more of the example embodiments disclosed herein is enabling the autonomous realignment of the transmission beam of a terminal device. Another advantage may be that realignment procedure optimizes uplink resource management by not relying on uplink sweep. A further advantage may be that power consumption in terminal device may be reduced. A yet further advantage may be that time and resources from network may be saved as the realignment procedure may be performed autonomously by a terminal device. A yet further advantage may be that throughput and overhead may be improved as the first radio beam maintains the radio connection during the search for a stronger connection.

Without in any way limiting the scope, interpretation, or application of the claims appearing below, a technical effect of one or more of the example embodiments disclosed herein is saving power needed for realignment process, as the terminal device does not have to increase power in transmission radio beam to compensate the non-correspondence. Another technical effect may be that the risk of radio link failure may be reduced as the first radio beam maintains the radio connection.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor (s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory storing instructions that, when executed by the at least one processor, cause the apparatus at least to:
provide at least one single-polarized radio beam in a first direction;
receive feedback for modifying operation of a terminal device for maintaining a radio connection;
determine select, in response to receiving the feedback and based on at least one criterion, a first component of a dual beam as a first radio beam and a second component of a dual beam as a second radio beam, wherein the first radio beam and the second radio beam are single-polarized, and wherein the at least one criterion comprises an indication of a power imbalance between the first component and the second component;
provide the first radio beam in the first direction and the second radio beam in a second direction; and
determine, based on the feedback relating to the first radio beam and the second radio beam, a need for reconfiguration of a following transmission of the first radio beam and the second beam.

2. The apparatus according to claim 1, wherein providing the first radio beam and the second radio beam comprises splitting a dual-polarized radio beam into a first single-polarized radio beam and a second single-polarized radio beam.

3. The apparatus according to claim 1, wherein the feedback for modifying operation of a terminal device comprises a request to increase a power level of a transmission radio beam or a request to adjust modulation coding scheme of the transmission radio beam.

4. The apparatus according to claim 1, wherein the at least one memory storing instructions that, when executed by the at least one processor, cause the apparatus to, provide the first radio beam in the second direction.

5. The apparatus according to claim 1, wherein the at least one criterion comprises a predetermined threshold value for the power imbalance.

6. The apparatus according to claim 1, wherein the apparatus comprises a terminal device.

7. The apparatus according to claim 1, wherein providing the second radio beam comprises providing an additional radio beam.

8. A method comprising:
providing at least one single-polarized radio beam in a first direction;
receiving feedback for modifying operation of a terminal device for maintaining a radio connection;
selecting, in response to receiving the feedback and based on at least one criterion, a first component of a dual beam as a first radio beam and a second component of a dual beam as a second radio beam, wherein the first radio beam and the second radio beam are single-polarized, and wherein the at least one criterion comprises an indication of a power imbalance between the first component and the second component;

providing the first radio beam in the first direction and the second radio beam in a second direction; and determining, based on feedback relating to the first radio beam and the second radio beam, a need for reconfiguration of a following transmission of the first radio beam and the second beam.

9. The method according to claim 8, wherein providing the first radio beam and the second radio beam comprises splitting a dual-polarized radio beam into a first single-polarized radio beam and a second single-polarized radio beam.

10. The method according to claim 8, wherein the feedback for modifying operation of a terminal device comprises a request to increase a power level of a transmission radio beam or a request to adjust a modulation coding scheme of the transmission radio beam.

11. The method according to claim 8, wherein the method comprises further providing the first radio beam in the second direction.

12. The method according to claim 8, wherein the at least one criterion comprises a predetermined threshold value for the power imbalance.

13. The method according to claim 8, wherein the method is carried out in a terminal device.

14. The method according to claim 8, wherein providing the second radio beam comprises providing an additional radio beam.

15. A non-transitory computer readable medium comprising program instructions that, when executed by an apparatus, cause the apparatus to perform at least the following:

providing at least one single-polarized radio beam in a first direction;

receiving feedback for modifying operation of a terminal device for maintaining a radio connection;

selecting, in response to receiving the feedback and based on at least one criterion, a first component of a dual beam as a first radio beam and a second component of a dual beam as a second radio beam, wherein the first radio beam and the second radio beam are single-polarized, and wherein the at least one criterion comprises an indication of a power imbalance between the first component and the second component;

providing the first radio beam in the first direction and the second radio beam in a second direction; and determining, based on feedback relating to the first radio beam and the second radio beam, a need for reconfiguration of a following transmission of the first radio beam and the second beam.

16. The non-transitory computer readable medium according to claim 15, wherein providing the first radio beam and the second radio beam comprises splitting a dual-polarized radio beam into a first single-polarized radio beam and a second single-polarized radio beam.

* * * * *